United States Patent [19]

Rusch

[11] 4,361,098
[45] Nov. 30, 1982

[54] STRUCTURAL MEMBERS AND ASSEMBLAGES

[76] Inventor: Richard B. Rusch, 55 Flagg Rd., Southborough, Mass. 01772

[21] Appl. No.: 827,592

[22] Filed: Aug. 25, 1977

Related U.S. Application Data

[63] Continuation of Ser. No. 645,428, Dec. 30, 1975, abandoned.

[51] Int. Cl.³ .............................................. A47B 5/02
[52] U.S. Cl. ................................... 108/152; 108/111; 108/153; 211/153
[58] Field of Search ............... 108/152, 153, 149, 108, 108/111, 134, 135; 211/153, 90; 248/235; 182/150, 82, 55

[56] References Cited

U.S. PATENT DOCUMENTS

| | | | |
|---|---|---|---|
| 231,402 | 8/1880 | Conklin | 108/152 |
| 275,027 | 4/1883 | Drake | 108/149 X |
| 1,001,946 | 8/1911 | Gumm | 182/82 X |
| 2,996,193 | 8/1961 | Olson | 108/152 X |
| 3,323,656 | 6/1967 | Weiss et al. | 108/152 X |
| 3,595,404 | 7/1971 | Goldstein et al. | 211/90 X |
| 3,677,202 | 7/1972 | Young | 108/111 X |
| 3,799,072 | 3/1974 | Slaboden | 108/149 X |
| 3,901,165 | 8/1975 | Schlesinger | 108/149 |

FOREIGN PATENT DOCUMENTS

| | | | |
|---|---|---|---|
| 510870 | 5/1952 | Belgium | 211/153 |
| 1285977 | 1/1962 | France | 108/152 |

Primary Examiner—William E. Lyddane
Attorney, Agent, or Firm—George E. Kersey

[57] ABSTRACT

Easily assembled structures formed by light weight members that are readily and securely joined using a compressible clip. The clip is attached projectingly to one member and inserted axially into another member whose inner walls compress the clip and form the desired junction between the two members. The assemblage is mounted vertically using elongated hooks.

12 Claims, 7 Drawing Figures

STRUCTURAL MEMBERS AND ASSEMBLAGES

This is a continuation of application Ser. No. 645,428, filed Dec. 30, 1975, now abandoned.

BACKGROUND OF THE INVENTION

This invention relates to structural members and assemblages and more particularly to light weight and easily assembled shelving structures and connectors.

Shelving structures are formed by the connection of members into frameworks which accommodate shelving. Such structures are needed for the organization, storage and support of articles.

A suitable form of shelving structure can be provided by using cantilever supports which are securely anchored in, for example, a wall. Alternatively the desired shelving can be provided by using support cleats which are securely attached to side panels.

While the foregoing kinds of shelving structures are generally suitable for the support and storage of articles, they can require a significant amount of assembly and can be relatively expensive, particularly if they are to support appreciable loads.

In the case of cantilever supports, for example, it is necessary to provide a heavily reinforced wall anchor, in order to provide the weight of the support brackets from prying the shelving from the anchor points in the case of even moderately heavy loads. In any case, conventional shelving structures require the use of substantial amounts of material to provide the desired framework and the shelving.

Accordingly, it is an object of the invention to simplify the production of structural assemblages. A related object is to simplify the production of assemblages for shelving which is required to support both ordinary and extraordinary loading.

A further object of the invention is to simplify the assemblage of structural supports. A related object is to realize the structural assemblage in which the constituent members can be joined together without the use of special tools. A related object of the invention is to provide a suitable assemblage in which the constituent members can be assembled substantially by hand.

Another object of the invention is to provide a structural assemblage which can be simply suspended from the supporting wall. Another object is to eliminate the need for cantilever supports which are included with respect to the wall as well as the need for cleats which are anchored inside panels.

Another object of the invention is to realize the structural assemblage which can be hung from a supporting wall without any appreciable alteration in the wall structure.

SUMMARY OF THE INVENTION

In accomplishing the foregoing and related objects, the invention provides a connector which is easily mounted with respect to an outer surface of one structural member and is insertable into a cross-sectional opening of another structural member that is to be joined to the first member.

In accordance with one aspect of the invention the structural members are formed by hollow tubing and the connector is in the form of a clip with prongs or fingers that are insertable into preformed apertures in an outer wall of one of the members. The connector thus mounted is then enveloped and compressed by the other member.

In accordance with another aspect of the invention, the connector is of a spring-like material, such as spring steel, and has a width which is larger than the maximum cross-sectional opening of the structural member that it is to receive. As a result, the enveloping member applies compressive force to the connector and causes it to grip tightly the member by which it is supported.

In accordance with still another aspect of the invention the connectors are employed with constituent members to form a lightweight framework that is readily assembled manually and is suspended from a mounting surface, such as a wall, by using an extended attachment member which has one end secured to the mounting wall and the other end secured in the framework.

In accordance with another aspect of the invention, the attachment member is in the form of a hook that is pivotally mounted in the wall using, for example, an eyelet, as well as pivotally mounted in the framework. As a result the framework is easily suspended from the supporting wall without requiring any significant alteration or modification of the wall, and at the same time the diagonal configuration of the attachment member provides a desirable distribution of the forces that allow the framework to support significant loads.

DESCRIPTION OF THE DRAWINGS

Other aspects of the invention will become apparent after considering several illustrative embodiments, taken in conjunction with the drawings in which.

DETAILED DESCRIPTION

Figure 1:
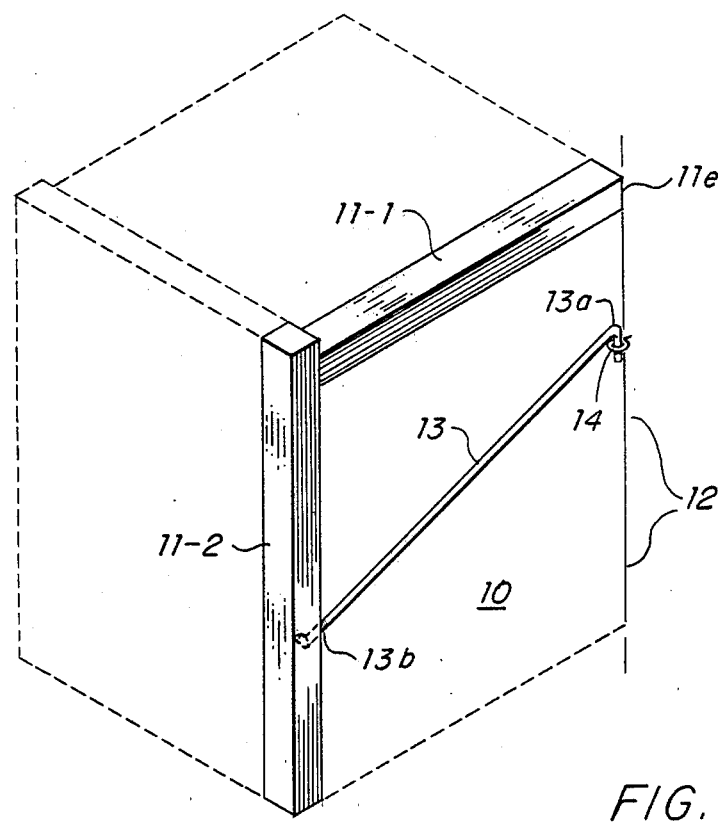
FIG. 1 is a perspective view of a structural assemblage in accordance with the invention.

Turning to the drawings a structural assemblage in accordance with the invention, taking the form of a framework, is illustrated in FIG. 1. As shown, the framework 10 is formed by two structural members 11-1 and 11-2. The framework 10 can be readily suspended from a mounting surface, such as a wall 12 by a diagonal attachment member 13.

A particularly suitable form of attachment member 13 is an elongated rod with oppositely rounded ends 13a and 13b. One of the rounded ends 13a is secured with respect to the wall 12 by being inserted, for example, into an anchor eye hook 14. As a result, the diagonal member 13 is pivotable with respect to the anchor hook 14 to produce a suitable distribution of forces. The opposite end 13b of the diagonal member 13, which is an oppositely curved projection from that of the anchor end 13a is secured to the assemblage 10 by a rounded aperture in the member 11-2 to permit a similar pivoting action at the junction of the member 13 with the member 11-2. It will be understood that a member (not shown) is to be positioned parallel to the member 11-1 along the parallel line path between the member 11-2 and the wall 12.

By contrast with prior art support assemblages, the assemblage 10 is not joined to the wall support 12 at the end 11e. As a result, the force exerted against the assemblage 10 amounts to a component of thrust on the end 11e which is balanced by a horizontal component of the thrust along the diagonal member 13.

Figure 2A:
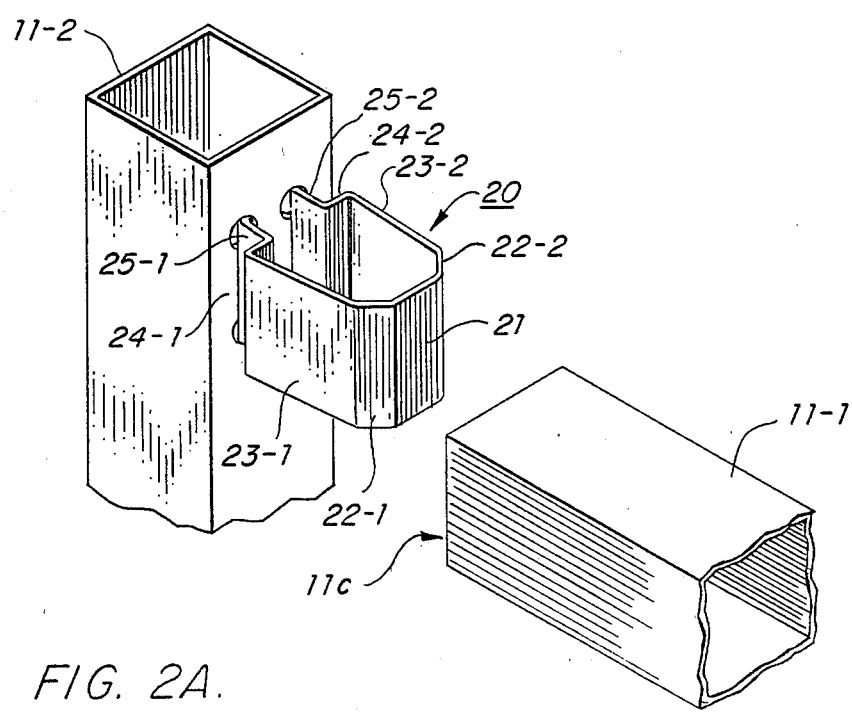
FIG. 2A is a perspective view of a portion of the assemblage of FIG. 1 showing one constituent member separated from another.

The constituent members 11-1 and 11-2 of the assemblage 10 are removably joined to one another using connectors of the type 20 shown in FIG. 2A. The connector 20 is manually mounted on the second member 11-2 so that it has an outwardly projecting portion that receives and is enveloped by the axial opening 11c of the first member 11-1. For illustration, the members 11-1 and 11-2 are of lightweight aluminum, with approximately rectangular cross-sections. Aluminum members of this type can be formed by longitudinally folding an aluminum strip and butt joining the free, longitudinal edges.

The connector 20 is advantageously made of spring steel with the projecting portion being formed by side panels 23-1 and 23-2 that are joined to an end panel 21 by connecting diagonal panels 22-1 and 22-2. At the mounting edge of the connector 20, the side panels 23-1 and 23-2 are joined to respective sets of corner members 24-1, 25-1 and 24-2 and 25-2. The corner members 25-1 and 25-2 end, in turn, in fingers, such as 26-1 and 26-2, that are inserted into apertures, such as the openings 11a-1 and 11a-2, of the support member 11-2.

The apertures for each set of fingers on the opposing mounting panels 25-1 and 25-2 are in a row of the support member that is perpendicular to its principal axis. Thus the apertures 11a-1 and 11a-2 of the member 11-2 are in a row that is perpendicular to the longitudinal axis A.

Figure 2B:
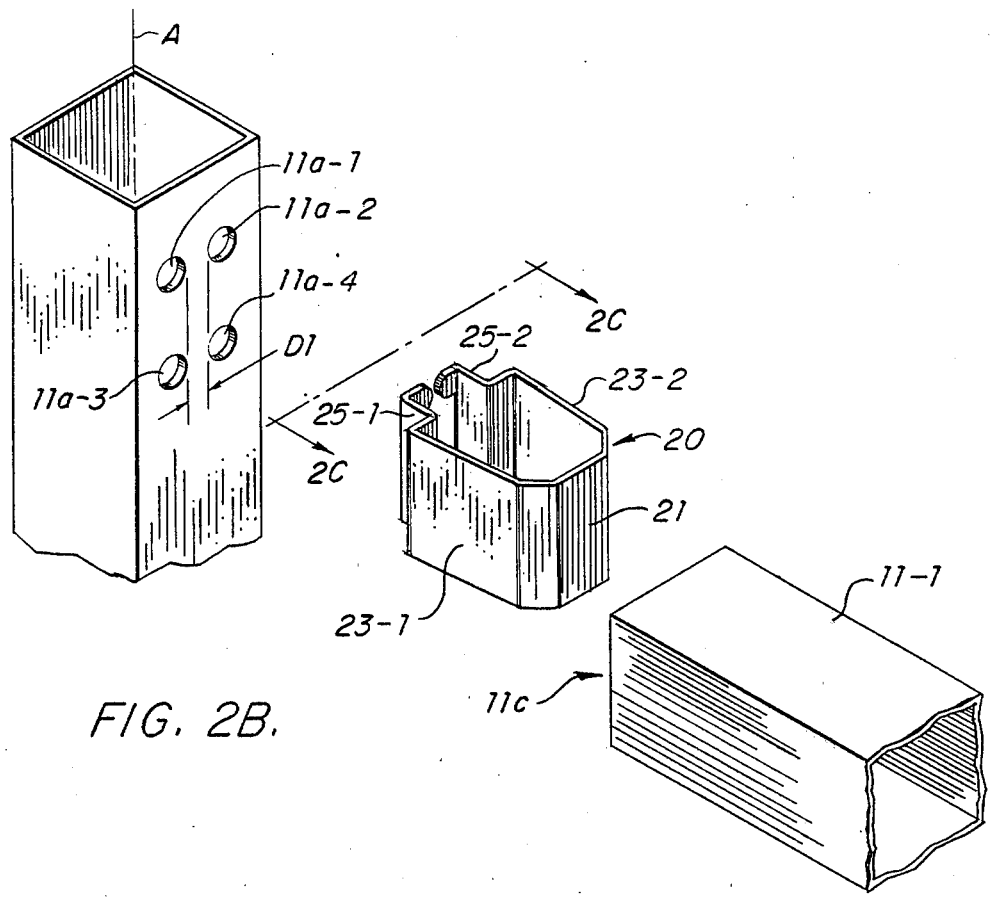
FIG. 2B is a further view of FIG. 2A showing the connector separated from its associated member.
Figure 2C:
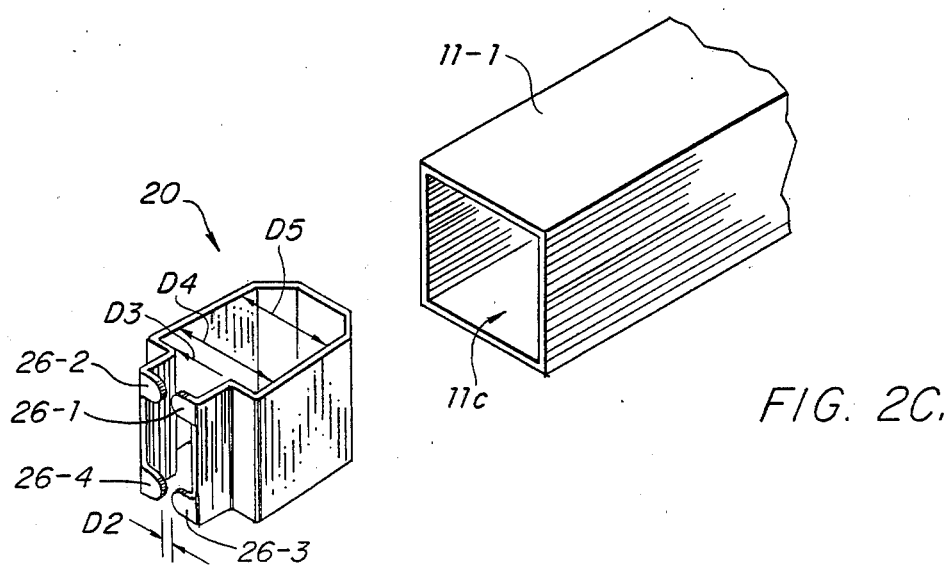
FIG. 2C is a perspective view of FIG. 2B from the mounting side of the connector.

More than one set of fingers, and consequently more than one set of apertures, can be provided to secure the connector 20 to its support 11-2, as indicated in FIGS. 2B and 2C where a second row of apertures 11a-3 and 11a-4 is provided for a second set of fingers 26-3 and 26-4.

In any event the separation of the apertures in each row is desirably greater than the gap between the associated fingers. Thus the distance of aperture separation D1 shown in FIG. 2B is greater than the distance of finger separation D2 shown in FIG. 2C.

Accordingly, the connector 20 is attached to the support 11-2 by first inserting the finger or fingers of one of the panels 25-1 or 25-2 into a column of apertures and separating the connector panels 23-1 and 23-2 until the remaining fingers can enter the remaining apertures. Thus, the fingers 26-2 and 26-4 (shown in FIG. 2C) can be inserted into the apertures 11a-2 and 11a-4 (FIG. 2B), and the panel 23-1 separated from the panel 23-2 until the fingers 26-1 and 26-3 are able to enter the apertures 11a-1 and 11a-3.

As a result, the connector 20 becomes projectingly attached to the support 11-2 as shown in FIG. 2A, and cannot fall from its mounting position by virtue of the engagement of the fingers 26-1 through 4 with the apertures 11a-1 through 4.

At the same time, the interaperture distance D1 is less than the finger panel distance D3. Consequently the connector 20 in the absence of stress applied to it, hangs loosely on the support 11-2.

In addition the distance D4 between the side panels 23-1 and 23-2, in the absence of stress, is greater than the cross sectional opening 11C of the member 11-1. However, to facilitate receipt of the member 11-1 by the connector 20, the side panels 23-1 and 23-2 are desirably configured as a partial wedge, with the distance of separation D5 near the diagonal panels being approximately the same as opening 11C.

Accordingly, when the connector 20 is inserted into the cross-sectional opening 11c, the side panels 23-1 and 23-2 are forced inwardly and apply spring tension against the inner walls of the member 11-1. This also brings the panels 25-1 and 25-2 towards each other, causing their junctions with the fingers 26-1 through 4 to grip the edges of the apertures 11a-1 through 4. The result is a secure connection of the two members 11-1 and 11-2. At the same time, however, the connection can be released, without damaging the members 11-1 and 11-2, by applying sufficient force to overcome the spring tension between the connector 20 and the member 11-1. This permits the assemblage 20 to be readily assembled and disassembled, while simultaneously permitting a coupling of between members of substantially the same quality as a permanent connection, for example of the welded type.

It will be understood that only one mode of attachment of the connector 20 to its support member 11-2 and coupling to the received member 11-1 is illustrated by FIGS. 2A through 2C and that many other modes are possible.

Figure 3A:
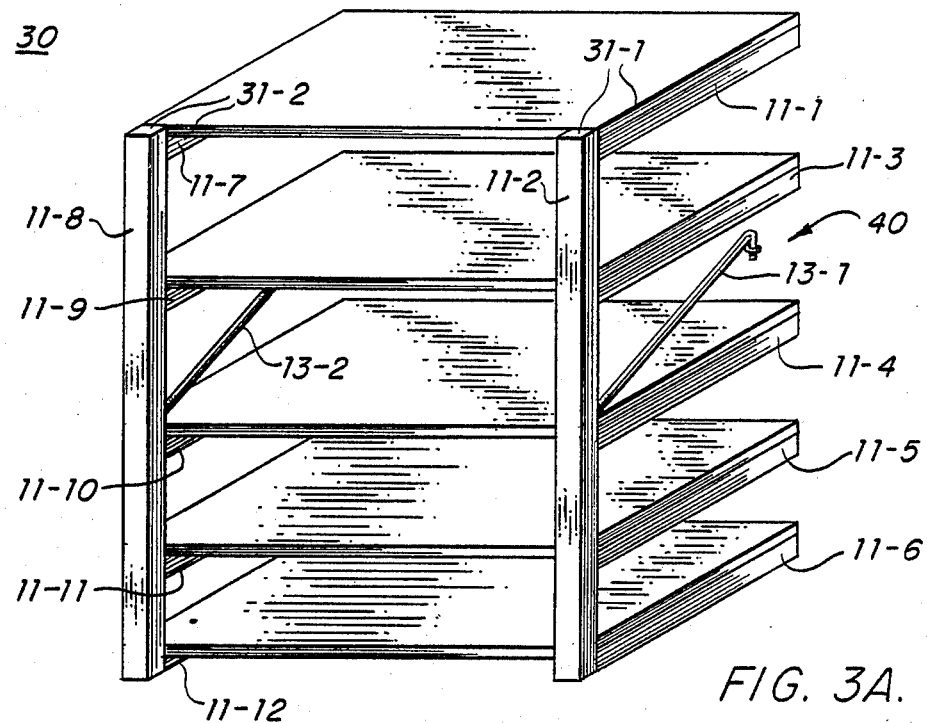
FIG. 3A is a perspective view of an alternative structural assemblage in accordance with the invention.

A complete structural assembly 30 using members 11-1 through 11-3, together with members 11-4 through 11-12 to form a framework with shelves 32-1 through 32-5 is shown in FIG. 3A.

The framework members 11-1 through 11-6 of the side support 31-1 are held together by connectors (not visible in FIG. 3A) of the type 20, illustrated in FIGS. 2A through 2C, as are the members 11-7 through 11-12 of the other side support 31-2.

Figure 3B:
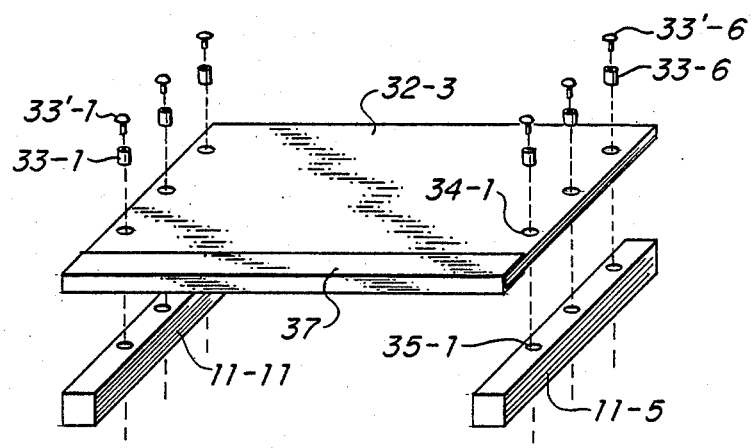
FIG. 3B is a perspective view showing the mounting of a shelf in the assemblage of FIG. 3A.

The two side supports 31-1 and 31-2 are joined by the shelves 32-1 through 32-5. The mode of attachment is illustrated in FIG. 3B for the illustrative shelf 32-3 which is connected to members 11-5 and 11-12.

The connection of the shelf 32-3 to the members 11-5 and 11-11 is made using anchors 33-1 through 33-6 and plugs 33'-1 through 33'-6.

The anchors are inserted through aligned apertures 34-1 through 34-6 in the shelf 32-3 into corresponding apertures 35-1 through 35-6 in the members 11-5 and 11-12. The plugs 34-1 through 34-6 are then inserted into the anchors, causing their base portions to expand and secure the shelf in place. The shelf 32-3 is advantageously of lightweight material which is reinforced at its front edge by a metallic sleeve 37 which is held in place by clips. A suitable lightweight material is provided by synthetics such as polymers, and a suitable sleeve is provided by aluminum.

Once the shelving structure 30 is completely assembled, it can be suspended from a wall 40 using the elongated hooks 13-1 and 13-2 which correspond to the attachment member 13 in FIG. 1.

Figure 3C:
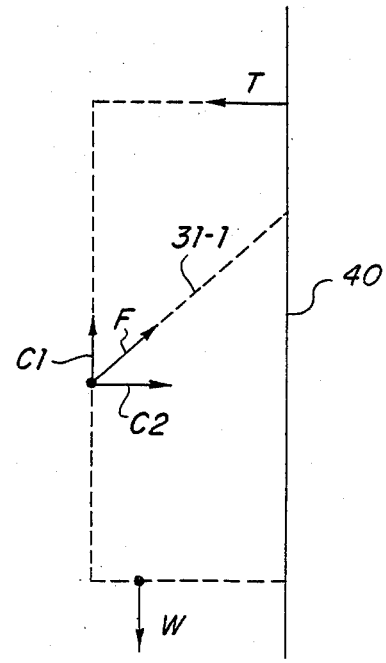
FIG. 3C is a sketch illustrating a hypothetical distribution of forces for the structure of FIG. 3A.

It is speculated that the distribution of forces for the assembly 30 is in accordance with the force diagram of FIG. 3C. Since there are two attachment members 31-1 and 31-2, one-half of the collective weight W of the supported objects is balanced by one of the components C1 of the force F along the support member 31-1. The other component C2 is believed to be balanced by the thrust T exerted by the wall 40. In any event empirical tests have demonstrated that the assembly can accommodate significant loading without damage. At the same time the assembly 30 is easy to store and ship in component form. It can be made of lightweight materials which can be easily assembled and disassembled, without requiring special tools or requiring significant structural modifications in mounting surfaces, such as walls. Yet the assembly 30 is able to take an appreciable amount of loading.

While various aspects of the invention have been set forth by the drawings and the specifications, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A structural assemblage comprising
   a support structure including first and second structural members perpendicularly connected to a tubular member having an aperture therein facing a mounting surface;
   and means having oppositely directed ends for pivotally hooking said tubular member at said aperture by one of said ends, and the mounting surface by the other of said ends for supporting said first and second members in a position perpendicular to said mounting surface without requiring their attachment to said mounting surface.

2. A structural assemblage as defined in claim 1 wherein said first and second structural members are of equal length.

3. A structural assemblage as defined in claim 1 wherein said first and second structural members are tubular.

4. A structural assemblage as defined in claim 1 wherein the hooking means is an elongated rod.

5. A structural assemblage as defined in claim 1 wherein the hooking means is secured to said mounting surface by an anchor eye hook.

6. A structural assemblage as defined in claim 1 wherein the aperture of said tubular member is rounded.

7. A structural assemblage as defined in claim 1 wherein the hooking means has a curved projection at each of said oppositely directed ends.

8. A structural assemblage as defined in claim 1 further including
   third and fourth structural members perpendicularly connected to another tubular member having an aperture therein facing said mounting surface;
   another means having oppositely directed ends for pivotally hooking said other tubular member at said aperture by one of said ends, and the mounting surface by the other of said ends for supporting said third and fourth members in a position perpendicular to said mounting surface without requiring their attachment to said mounting surface; and
   means joining said first and second structural members to said third and fourth structural members.

9. A structural assemblage as defined in claim 8 wherein the means joining said first and second structural members to said third and fourth structural members comprises a shelf joining the first member to the third member and a further shelf joining the second member to the fourth member.

10. A support structure as defined in claim 1 wherein a shelf is connected to one of said members.

11. A support structure as defined in claim 10 wherein the shelf is reinforced along one edge by a sleeve.

12. A support structure as defined in claim 11 wherein the shelf is of polymeric material and the reinforcing sleeve is metallic.

* * * * *